US012773734B2

(12) United States Patent
Shan et al.

(10) Patent No.: US 12,773,734 B2
(45) Date of Patent: Oct. 27, 2026

(54) LOW-TEMPERATURE AIRFLOW FOLLOW-UP AUXILIARY SAND DISCHARGE APPARATUS AND METHOD FOR CUTTING FROZEN SAND MOLD

(71) Applicant: NANJING UNIVERSITY OF AERONAUTICS AND ASTRONAUTICS, Nanjing (CN)

(72) Inventors: Zhongde Shan, Nanjing (CN); Haoqin Yang, Nanjing (CN); Qinjiang Liu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 993 days.

(21) Appl. No.: 18/008,979

(22) PCT Filed: Jun. 15, 2022

(86) PCT No.: PCT/CN2022/098842
§ 371 (c)(1),
(2) Date: Dec. 8, 2022

(87) PCT Pub. No.: WO2023/005474
PCT Pub. Date: Feb. 2, 2023

(65) Prior Publication Data

US 2024/0024956 A1 Jan. 25, 2024

(30) Foreign Application Priority Data

Jul. 28, 2021 (CN) ......................... 202110857648.0

(51) Int. Cl.
*B23B 27/10* (2006.01)
*B22C 9/02* (2006.01)
(Continued)

(52) U.S. Cl.
CPC ............ *B23B 27/10* (2013.01); *B23B 51/068* (2022.01); *B23C 5/28* (2013.01); *B23Q 11/005* (2013.01); *B23Q 11/126* (2013.01); *B22C 9/02* (2013.01)

(58) Field of Classification Search
CPC ....... B23B 27/10; B23B 51/06; B23B 51/068; B23B 51/0682; B23B 51/0686;
(Continued)

(56) References Cited

U.S. PATENT DOCUMENTS 6,286,581 B1 * 9/2001 Gustafson ................ B22C 9/02 164/17
6,443,672 B1 9/2002 Lagerberg
(Continued)

FOREIGN PATENT DOCUMENTS

CN 101372135 A 2/2009
CN 201350492 11/2009
(Continued)

*Primary Examiner* — Monica S Carter
*Assistant Examiner* — Kent N Shum
(74) *Attorney, Agent, or Firm* — Bayramoglu Law Offices LLC

(57) ABSTRACT

A low-temperature airflow follow-up auxiliary sand discharge apparatus for cutting a frozen sand mold includes a frozen sand mold to be machined, a hollow cutter, a spindle mounted on the hollow cutter, an air pipe, and a refrigeration apparatus connected to one end of the air pipe. The refrigeration apparatus is fixed to an air pump by a valve. An inner cavity of the hollow cutter is provided with a cutter through hole along an axis. An inner cavity of the spindle is provided with a spindle through hole along the axis. An upper end of the spindle is provided with a bearing seat hole for placing a bearing. An outer circle of the bearing matches the bearing
(Continued)

seat hole, and an inner circle of the bearing is mounted with an air pipe connector. The air pipe is connected and fixed to the air pipe connector.

8 Claims, 1 Drawing Sheet

(51) Int. Cl.

| | |
|---|---|
| ***B23B 51/06*** | (2006.01) |
| ***B23C 5/28*** | (2006.01) |
| ***B23Q 11/00*** | (2006.01) |
| ***B23Q 11/12*** | (2006.01) |

(58) Field of Classification Search
CPC ....... B23Q 11/10; B23Q 11/126; B23Q 11/12; B23Q 11/005; B22C 9/02; B23C 2210/246; B23C 5/28; B23C 5/283; B23C 5/282; B23C 5/287; B24B 19/02; B24B 55/02; B24B 55/06; B24B 55/102; B24D 5/02; B24D 7/18
USPC .................................................. 451/541, 548
See application file for complete search history.

(56) References Cited

U.S. PATENT DOCUMENTS

| | | | | | |
|---|---|---|---|---|---|
| 2009/0226268 | A1* | 9/2009 | Pilkington | ................ | B23C 5/28<br>407/113 |
| 2011/0230993 | A1* | 9/2011 | Shan | ......................... | B22C 9/02<br>700/98 |
| 2014/0356087 | A1* | 12/2014 | Best | ........................ | B23B 51/06<br>408/58 |
| 2020/0001381 | A1* | 1/2020 | Wang | ........................ | B23C 5/28 |
| 2021/0347000 | A1* | 11/2021 | Wang | ....................... | B23Q 3/12 |

FOREIGN PATENT DOCUMENTS

| | | | | | |
|---|---|---|---|---|---|
| CN | 202894230 | | 4/2013 | | |
| CN | 105665637 | | 6/2016 | | |
| CN | 207386596 | U | 5/2018 | | |
| CN | 109332578 | | 2/2019 | | |
| CN | 113560495 | A | 10/2021 | | |
| DE | 102004040166 | | 3/2006 | | |
| EP | 2353779 | | 8/2011 | | |
| GB | 2160454 | A * | 12/1985 | ............. | B22D 19/14 |

* cited by examiner

LOW-TEMPERATURE AIRFLOW FOLLOW-UP AUXILIARY SAND DISCHARGE APPARATUS AND METHOD FOR CUTTING FROZEN SAND MOLD

CROSS REFERENCE TO THE RELATED APPLICATIONS

This application is the national phase entry of International Application No. PCT/CN2022/098842, filed on Jun. 15, 2022, which is based upon and claims priority to Chinese Patent Application No. 202110857648.0, filed on Jul. 28, 2021.

TECHNICAL FIELD

The present invention belongs to the field of non-traditional machining machine tool accessories, and in particular, to a low-temperature airflow follow-up auxiliary sand discharge apparatus and method for cutting a frozen sand mold.

BACKGROUND

Energy and resource consumption of traditional foundry industry is very large, turnover formwork preparation and mold manufacturing of a wooden mold/metal mold have a long cycle, low dimensional accuracy, and large pollution emissions, and green casting and clean production have become the most urgent tasks in the foundry industry. A frozen sand mold for casting comes into being as the times require. The sand mold uses water as a binder and various sand particles as refractory aggregate. After molding sand particles mixed with appropriate water are frozen to prepare frozen sand billets under a low temperature environment, rapid forming of the frozen sand mold is implemented by means of a digital dieless casting forming technology based on a cutting forming principle, and finally qualified castings are obtained by pouring. During the pouring, the water in the frozen sand mold evaporates rapidly, and it is not easy to produce defects such as pores. After the pouring, the frozen sand mold collapses by itself, and tensile strength and other properties of a frozen casting sample will be improved.

During a numerical control cutting and forming process of the frozen sand mold, sand discharge is a main problem affecting cutting and machining accuracy and a service life of the cutter. During the cutting and forming process of the frozen sand mold, a traditional cutting fluid cannot be used to clean the waste sand. The waste sand stays in the sand mold and cause harmful friction with the cutter, which will aggravate the wear and tear of the cutter and reduce the service life of the cutter. High-speed cutting of the sand mold generates splashed sand chips which may damage the surface quality when splashed on the surface of the sand mold. During a process of the high-speed cutting of the frozen mold, cutting heat may be generated to melt the surface of the frozen sand mold. Waste chips cut from the frozen sand mold are different from that of a normal sand mold. The former uses water as the binder of the sand mold, so there is a lot of ice and water in the cutting chips during the cutting process, and if the chips are not cleaned in time, fallen ice chips and small water droplets may be bonded on the surface of the processed sand mold or even on the cutter under the low temperature environment, thereby seriously affecting the surface quality of the sand mold and the use of the cutter. Therefore, during the whole machining process of the frozen sand mold, the sand discharge is a problem must be solved in the digital dieless frozen casting forming process.

SUMMARY

To solve the above problem, the present invention discloses a low-temperature airflow follow-up auxiliary sand discharge apparatus for cutting a frozen sand mold, and during a process of cutting a frozen sand mold at a low temperature, the apparatus may effectively lower a cutting temperature, protect the frozen sand mold from cutting heat damage, implement cutting and blowing at any time, clean waste sand rapidly, and reduce influences of residual waste sand on the surface quality of the sand mold and the wear and tear of a cutter, thereby improving the surface quality of the frozen sand mold and a service life of the cutter.

To implement functions of the above apparatus, a low-temperature airflow follow-up auxiliary sand discharge apparatus for cutting a frozen sand mold includes a hollow cutter, a spindle mounted on the hollow cutter, an air pipe, and a refrigeration apparatus connected to one end of the air pipe, where the refrigeration apparatus is connected and fixed to an air pump by means of a valve; an inner cavity of the hollow cutter is provided with a cutter through hole along an axis; an inner cavity of the spindle is provided with a spindle through hole along the axis; the cutter through hole is opposite to and communicates with the spindle through hole along a coaxial line; an upper end of the spindle is provided with a bearing seat hole for placing a bearing, where an outer circle of the bearing matches the bearing seat hole, and an inner circle of the bearing is mounted with an air pipe connector; the air pipe is connected and fixed to the air pipe connector; and a surface of the hollow cutter is provided with air jet holes penetrating the cutter through hole.

Further improvements of the present invention are that: a lower end of the spindle is mounted with the hollow cutter by means of a spring collet; and the hollow cutter is securely and reliably clamped while ensuring that the through holes are opposite to each other.

Further improvements of the present invention are that an end surface of a cutter head of the hollow cutter is provided with front cutting edges and an outer cylindrical surface of the hollow cutter is provided with spiral cutting edges, the number of air jet holes is equal to or less than that of cutting edges of the hollow cutter, and the air jet holes are distributed in intervals of the spiral cutting edges uniformly along spiral directions of the spiral cutting edges.

Further improvements of the present invention are that: an angle between a central axis of the air jet holes and a cross section of the hollow cutter is greater than 0°.

Further improvements of the present invention are that: an angle between a central axis of the air jet holes and a central axis of the hollow cutter is within 60° to 70°.

A low-temperature airflow follow-up auxiliary sand discharge method for cutting a frozen sand mold, the method including the following steps:

step 1: using the hollow cutter and the spindle, where the hollow cutter is provided with the cutter through hole, the spindle is provided with the spindle through hole, and the cutter through hole is in communication with the spindle through hole as an air jet channel;

step 2: connecting the air pipe to the refrigeration apparatus and the air pump that are provided on the air pipe, and the upper end of the spindle being provided with the air pipe connector;

step 3: during a numerical control machining process of the frozen sand mold, turning on the air pump and the valve to make compressed air in the air pump pass through the refrigeration apparatus along the air pipe to become a low-temperature airflow; and step 4: the low-temperature airflow flowing through the air jet channel of the spindle and the hollow cutter from the air pipe connector, and finally being jetted in a high speed from an air outlet and the air jet holes at the bottom of the hollow cutter, thereby lowering a temperature of a cutting region and blowing away waste sand from the sand mold at the same time.

The valve is a solenoid valve, and an air flow rate of the valve is controlled by an electric signal.

The refrigeration apparatus can ensure that a cooling air temperature measured at the air jet hole of the hollow cutter is not higher than −30° C. and cooling air that is dry enough can be blown.

The present invention uses a hollow cutter with a flat bottom and a plurality of cutting edges, and the hollow cutter has a larger chip space compared with a normal milling cutter and a relatively large chip discharge space, which may restrain a phenomenon that ice chips cut during the cutting of the frozen sand mold are easy to be piled up and stuck together and cannot be discharged.

The working principle of the present invention is that: during a machining process, the air pump and the refrigeration apparatus are first turned on, and the valve mounted on the air pipe may use the solenoid valve and may be turned on under the control of a numerical control system. A temperature of cooling air is measured at an accessory of an air outlet of the air jet hole or the cutter through hole, to obtain temperature information at the cooling air outlet, and after it is ensured that the temperature of the cooling air blown from the hollow cutter is not higher than-30° C., a digital dieless frozen casting forming machine is turned on to start to cut the frozen sand mold. The cooling air is jetted from the air jet channel composed of the hollow cutter and the spindle, and therefore, cutting and blowing at any time are implemented. During the cutting process, the air pump sends a high pressure air source to the refrigeration apparatus to obtain high-speed low-temperature airflow that has a low temperature and is dry enough from the refrigeration apparatus; the low-temperature airflow enters the air jet channel composed of through holes of the spindle and the hollow cutter from the air pipe connector via the air pipe and is jetted to a cutting region of the cutter from the air jet holes of the hollow cutter and the air outlet at the bottom of the cutter through hole finally, to form the high-speed low-temperature airflow at the cutting region; the high-speed low-temperature airflow blows the waste sand generated by cutting out of the region of the frozen sand mold in a timely and rapid manner to prevent the residual sand chips from being bonded to the machined surface of the frozen sand mold by means of the ice and water contained therein in a low temperature environment to reduce the surface accuracy of the sand mold; and at the same time, a temperature in the cutting region is lowered by means of forced heat transfer, which not only protects the frozen sand mold from damage, but also improves a service life of the machining cutter.

Beneficial effects of the present invention are that:

1. Sand discharge is timely. The apparatus of the present invention jets the high pressure cooling air at the air jet holes on the cutter and the air outlet at the bottom of the cutter by using the hollow cutter to implement cutting and blowing at any time, and the waste sand is blown away timely, which avoids a large amount of pile-up waste sand seriously affecting subsequent machining accuracy and the service life of the cutter.
2. The waste sand is completely cleaned. During an actual operation process, the high pressure cooling air is directly jetted from the interior of the cutter and blows away the sand chips generated by machining the frozen sand mold under a close range action, such that it is ensured that there is no residual sand chips on the surface of the frozen sand mold, thereby preventing the sand chips from being bonded to the surface of the machined sand mold by means of the ice and water thereon in the low temperature environment to damage the surface accuracy of the sand mold.
3. The frozen sand mold is protected and the service life of the cutter is improved. According to the apparatus, the high-speed low-temperature airflow is blown to the cutting region, and the temperature of the cutting region is lowered by means of forced convection heat transfer, such that melting of frozen water used as the binder in the frozen sand mold is avoided, and lowering the cutting temperature can further control the wear and tear and of the cutter and improve the service life of the cutter.

Figure 1:
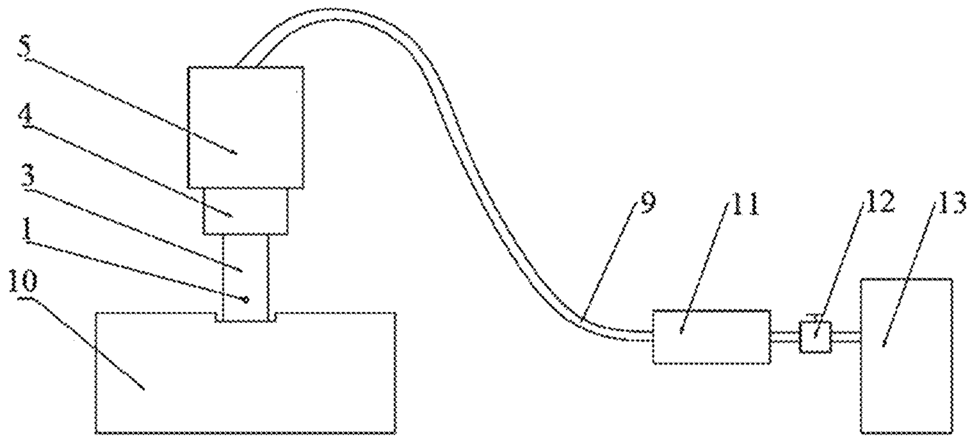
FIG. 1 is a schematic structure diagram of the present invention.

In the figures: 1—air jet hole, 2—cutter through hole, 3—hollow cutter, 4—spring collet, 5—spindle, 6—spindle through hole, 7—bearing, 8—air pipe connector, 9—air pipe, 10—frozen sand mold, 11—refrigeration apparatus, 12—valve, and 13—air pump.

DETAILED DESCRIPTION OF THE EMBODIMENTS

The present invention is further illustrated below in conjunction with the drawings and specific embodiments, and it should be understood that the following specific embodiments are merely used to illustrate the present invention and not to limit the scope of the present invention. It should be noted that the words "front", "back", "left", "right", "upper", and "lower" used in the following description refer to directions in the drawings, and the words "inner" and "outer" respectively refer to directions toward or away from the geometric center of a particular component.

Figure 2:
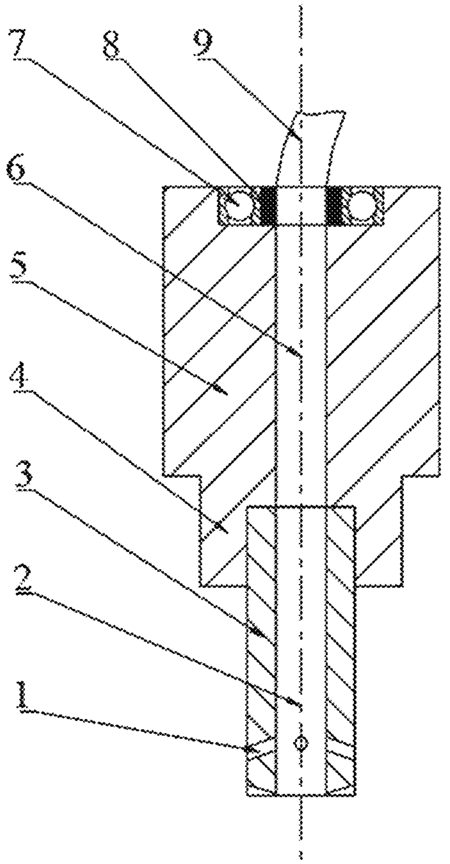
FIG. 2 is a front sectional view of a part of a spindle and a cutter according the present invention.

As shown in FIGS. 1 and 2, a low-temperature airflow follow-up auxiliary sand discharge apparatus for cutting a frozen sand mold of the embodiment includes a frozen sand mold 10 to be machined, a hollow cutter 3, and a spindle 5 mounted on the hollow cutter 3, where an upper end of the spindle 5 is provided with a bearing seat hole for placing a bearing 7, an outer circle of the bearing 7 matches the bearing seat hole, an inner circle of the bearing 7 is mounted with an air pipe connector 8 for accessing an air pipe 9, the air pipe 9 is connected to a refrigeration apparatus 11, a valve 12, and an air pump 13 that are provided on the air pipe 9, and the valve 12 is configured to adjust a flow rate of compressed air.

In this embodiment, the hollow cutter 3 is used, where the hollow cutter 3 is provided with a cutter through hole 2 as an air jet channel along an axis. Accordingly, the spindle 5 is also provided with a spindle through hole 6 as the air jet channel along the axis, and when the hollow cutter is mounted on the spindle, it should be ensured that the cutter through hole 2 is opposite to the spindle through hole 6 along a coaxial line to make an air jet channel composed of the two through holes normally convey the low-temperature airflow. Preferably, the hollow cutter 3 is mounted on the spindle 5 by using a spring collet 4, and the hollow cutter 3 is securely and reliably clamped while ensuring that the through holes are opposite to each other.

An outer wall of the cutter through hole 2 of the hollow cutter 3 used in the present invention is provided with air jet holes 1 that the through hole penetrates, and a plurality of air jet holes 1 are provided. In this embodiment, there are four spiral cutting edges on the hollow cutter 3, and the air jet holes 1 should be distributed uniformly and at circumferential intervals around the cutter through hole 2 of the hollow cutter 3. Because locations of the air jet holes 1 cannot damage cutting edges on an outer cylindrical surface of the hollow cutter 3, the number of air jet holes is equal to or less than that of the cutting edges of the hollow cutter, and the air jet holes are uniformly distributed at intervals of the cutting edges along spiral directions of the cutting edges.

In the present invention, an angle between a central axis of the air jet holes 1 and a cross section of the hollow cutter is greater than 0°, that is, cross sections of the air jet holes 1 and the hollow cutter 3 are not provided parallelly, but are provided obliquely to jet air to a machined surface of the sand mold. Preferably, an angle between the central axis of the air jet holes 1 and the central axis of the hollow cutter 3 is within 60° to 70°.

During a machining process, the air pump 13 and the refrigeration apparatus 11 are first turned on, and the valve 12 mounted on the air pipe 9 may use the solenoid valve and may be turned on under the control of a numerical control system. A temperature of cooling air is measured at an accessory of an air outlet of the air jet hole 1 or the cutter through hole 2, to obtain temperature information at the cooling air outlet, and after it is ensured that the temperature of the cooling air blown from the hollow cutter 3 is not higher than −30° C., a digital dieless frozen casting forming machine is turned on to start to cut the frozen sand mold 10. The cooling air is jetted from the air jet channel composed of the hollow cutter and the spindle, and therefore, cutting and blowing at any time are implemented. During the cutting process, the air pump 13 sends a high pressure air source to the refrigeration apparatus 11 to obtain a high-speed low-temperature airflow that has a low temperature and is dry enough from the refrigeration apparatus 11; the low-temperature airflow enters the air jet channel composed of through holes of the spindle 5 and the hollow cutter 3 from the air pipe connector 8 via the air pipe 9 and is jetted to a cutting region of the cutter from the air jet holes 1 of the hollow cutter and the air outlet at the bottom of the cutter through hole 2 finally, to form the high-speed low-temperature airflow at the cutting region; the high-speed low-temperature airflow blows the waste sand generated by cutting out of the region of the frozen sand mold 10 in a timely and rapid manner to prevent the residual sand chips from being bonded to the machined surface of the frozen sand mold by means of the ice and water contained therein in a low temperature environment to reduce the surface accuracy of the sand mold; and at the same time, a temperature in the cutting region is lowered by means of forced heat transfer, which not only protects the frozen sand mold 10 from damage, but also improves a service life of the hollow cutter 3.

According to the sand discharge apparatus of the present invention, sand blowing and chip discharge are performed together with the movement of the cutter, and the blown high-speed low-temperature airflow is applicable to the cutting and forming process of the frozen sand mold and can meet a special demand of the frozen sand mold for the sand discharge.

The technical means disclosed by the technical solution of the present invention are not limited to these disclosed in the above implementations and further include the technical solution formed by any combination of the above technical features.

What is claimed is:

1. A low-temperature airflow follow-up auxiliary sand discharge apparatus for cutting a frozen sand mold, comprising:

a hollow cutter, a spindle mounted on the hollow cutter, an air pipe, and a refrigeration apparatus connected to one end of the air pipe;

wherein the refrigeration apparatus is connected and fixed to an air pump by a valve; an inner cavity of the hollow cutter is provided with a cutter through hole along an axis; an inner cavity of the spindle is provided with a spindle through hole along the axis; the cutter through hole is opposite to and communicates with the spindle through hole along a coaxial line; an upper end of the spindle is provided with a bearing seat hole for placing a bearing, wherein an outer circle of the bearing matches the bearing seat hole, and an inner circle of the bearing is mounted with an air pipe connector; the air pipe is connected and fixed to the air pipe connector; and a surface of the hollow cutter is provided with air jet holes connected to the cutter through hole.

2. The low-temperature airflow follow-up auxiliary sand discharge apparatus for cutting the frozen sand mold according to claim 1, wherein a lower end of the spindle is mounted with the hollow cutter by a spring collet.

3. The low-temperature airflow follow-up auxiliary sand discharge apparatus for cutting the frozen sand mold according to claim 1, wherein an end surface of a cutter head of the hollow cutter is provided with front cutting edges, and an outer cylindrical surface of the hollow cutter is provided with spiral cutting edges; a number of the air jet holes is equal to or less than a number of the spiral cutting edges of the hollow cutter, and the air jet holes are distributed uniformly at circumferential intervals around the cutter through hole of the hollow cutter.

4. The low-temperature airflow follow-up auxiliary sand discharge apparatus for cutting the frozen sand mold according to claim 1, wherein an angle between a central axis of each of the air jet holes and a central axis of the hollow cutter is greater than 0°.

5. The low-temperature airflow follow-up auxiliary sand discharge apparatus for cutting the frozen sand mold according to claim 4, wherein an angle between a central axis of each of the air jet holes and a central axis of the hollow cutter is within 60° to 70°.

6. A low-temperature airflow follow-up auxiliary sand discharge method for cutting a frozen sand mold using the low-temperature airflow follow-up auxiliary sand discharge apparatus for cutting the frozen sand mold according to claim 1, wherein the low-temperature airflow follow-up auxiliary sand discharge method comprises the following steps:

step 1: using the hollow cutter and the spindle, wherein the hollow cutter is provided with the cutter through hole, the spindle is provided with the spindle through hole, and the cutter through hole is in communication with the spindle through hole as an air jet channel;

step 2: during a numerical control machining process of the frozen sand mold, turning on the air pump and the valve to allow compressed air in the air pump to pass through the refrigeration apparatus along the air pipe to become low-temperature airflow; and step 3: allowing the low-temperature airflow to flow through the air jet channel of the spindle and the hollow cutter from the air pipe connector, and finally to be jetted in a high speed from an air outlet and the air jet holes at a bottom of the hollow cutter, wherein a temperature of a cutting region is lowered and waste sand is blown away from the frozen sand mold at a same time.

7. The low-temperature airflow follow-up auxiliary sand discharge method for cutting the frozen sand mold according to claim 6, wherein the valve is a solenoid valve, and an air flow rate of the valve is controlled by an electric signal.

8. The low-temperature airflow follow-up auxiliary sand discharge method for cutting the frozen sand mold according to claim 6, wherein the refrigeration apparatus ensures that a cooling air temperature measured at the air jet hole of the hollow cutter is equal to or less than −30° C. and cooling air is blown.

* * * * *